United States Patent [19]
Bringol

[11] 3,979,651
[45] Sept. 7, 1976

[54] DIRECT CURRENT AND SYNCHRONOUS MOTOR SYSTEM

[75] Inventor: Charles Ronald Bringol, Austin, Tex.

[73] Assignee: International Business Machines Corporation, Armonk, N.Y.

[22] Filed: Dec. 23, 1974

[21] Appl. No.: 535,638

[52] U.S. Cl. ............................... 318/138; 318/254; 318/259; 318/270; 318/415; 318/685
[51] Int. Cl.$^2$ ........................................ H02K 29/00
[58] Field of Search ............ 318/138, 254, 259, 270, 318/341, 415, 685, 696

[56] References Cited
UNITED STATES PATENTS

| | | | |
|---|---|---|---|
| 3,518,516 | 6/1970 | Pawletko | 318/415 X |
| 3,601,678 | 8/1971 | Abraham et al. | 318/685 |
| 3,706,923 | 12/1972 | Dunfield | 318/415 X |
| 3,783,357 | 1/1974 | Ichiyanage | 318/685 X |

*Primary Examiner*—Gene Z. Rubinson
*Attorney, Agent, or Firm*—Douglas H. Lefeve

[57] ABSTRACT

A motor control system in which direct current is sequentially applied to portions of the motor stator windings in response to rotor position signals generated by Hall effect devices until the rotor has reached a desired angular velocity corresponding to the frequency of a source of reference pulses, at which time the portions of the stator windings are driven in a synchronous manner by pulses having a fixed duration and the same frequency as the reference pulses. In the synchronous mode the Hall effect signals are used only in conjunction with circuitry to determine whether or not the rotor is continuing to rotate at the desired, synchronous velocity. The motor is stopped by reverse application of direct current drive to the windings in the direct current drive mode and, again, in accordance with the position signals output from the Hall effect devices. Sine and cosine drive circuitry is disclosed to enable the generation of a substantially continuously rotating magnetic field by the stator windings to allow smooth rotor rotation at very low speeds. Further circuitry is disclosed to provide a hyperbolic variation in the frequency of the reference pulses to allow utilization of the motor system in a disc recording system, whereby substantially constant tangential velocity of a portion of the disc adjacent to a transducer radially movable along the disc is realized by movement by the transducer of a wiper of a linear potentiometer included in the hyperbolic frequency generator circuit.

14 Claims, 9 Drawing Figures

DIRECT CURRENT AND SYNCHRONOUS MOTOR SYSTEM

BACKGROUND OF THE INVENTION

1. Field of the Invention

This invention relates to motor control systems in which a direct current motor is started by the sequential application of direct current until a predetermined speed is reached and maintained at said predetermined speed by application of fixed duration pulses equal in frequency to reference pulses having a proportional relationship to desired rotor velocity.

2. Description of the Prior Art

Motor control systems are known in which a motor is started and accelerated in a first mode of operation until reaching a predetermined angular velocity and then run in a second mode of operation to more adequately assure that the predetermined angular velocity is maintained. Snychronous motor operation is one operating mode often employed to maintain a substantially constant predetermined velocity; however, conventional synchronous motors generally require auxiliary windings or auxiliary prime mover means to accelerate the rotor to the synchronous speed.

The prior art includes systems for operating motors, other than motors primarily designed for operation as synchronous motors, in the mode for which they were designed for starting and acceleration and in a second mode, which may be broadly categorized as synchronous operation, for maintaining a predetermined speed. For example, U.S. Pat. Nos. 3,518,516 and 3,601,678 teach systems in which a stepping motor having a multi-toothed rotor is brought up to a predetermined speed by sequentially driving the stator windings in a step-by-step fashion with oscillator pulses generated by a resettable oscillator in response to emitter pulses indicative of rotor movement. Upon reaching the predetermined speed the windings are driven by oscillator pulses from the resettable oscillator, irrespective of emitter pulses, until a speed change occurs, at which time the system reverts to the first, stepping mode of operation until the predetermined speed is again reached. One problem with this system is that stepping motors are relatively expensive compared with, for example, permanent magnet, direct current motors. Another problem is that the resettable oscillator cannot be easily crystal controlled, although crystal control would be advantageous in systems in which a predetermined speed proportional to the frequency of a train of reference pulses is desired. Further, because of flux variations during rotation by virtue of the multi-toothed rotor of the stepping motor taught by these patents, it would be impractical to attempt to use this motor system for smooth operation at relatively slow speeds.

In another example of the prior art, U.S. Pat. No. 3,783,357 teaches a system in which pulses from a reference oscillator set latches to provide direct current for starting an electronically commutated DC motor. With each rotor revolution the latches become reset in response to rotor position. When the rotor reaches the system design velocity, the frequency of drive pulses to the windings is equal to the frequency of the reference pulses. However, the drive pulses are terminated in response to rotor position, so that the drive pulses have varying width. Terminating the motor drive pulses in response to rotor position assures that the drive pulses enable the production of only positive torque by the rotor which, in instances wherein the mechanical load on the rotor is suddenly decreased, can result in an acceleration of the rotor above the synchronous speed. The solution to this problem taught by the patent takes the form of logic circuitry to automatically change the drive voltage to the windings when minimum and maximum drive pulse widths are exceeded due to changes in torque; however, this solution requires the motor to temporarily drop out of synchronism for each voltage change to take place which, results in imprecise speed regulation, particularly at low speeds.

It would, therefore, be advantageous to provide a system in which an inexpensive motor can be operated with precise speed regulation at predetermined speeds, including substantially low speeds, and over a wide range of torque values while maintaining the precise speed regulation. It would further be advantageous to provide for starting, accelerating, and stopping the motor in such a system in a manner not requiring elaborate logic circuitry or auxiliary windings. It would also be advantageous to achieve very smooth operation of this motor at very low speeds. It would also be advantageous to achieve a closely regulated, hyperbolic speed variation of the motor in accordance with a linear change in the position of the wiper of a linear potentiometer.

SUMMARY OF THE INVENTION

Accordingly, a motor control system is provided for a motor having at least two stator winding portions angularly displaced from each other and a rotor, in which the motor is started in accordance with direct current drive sequentially applied to the stator winding portions in accordance with the position of the rotor relative to the windings. A source of reference pulses having a frequency corresponding to a desired angular velocity of the rotor is applied to one input of a comparator and position signals indicative of the position of the rotor relative to the windings is applied to another input of the comparator. The comparator provides a first signal when the velocity of the rotor is equal to the desired angular velocity and a second signal when the angular velocity of the rotor is less than the desired angular velocity. Logic circuitry is provided for starting and accelerating the motor as a direct current motor during the duration of the second signal output from the comparator until the desired velocity is reached and then running the motor as a synchronous motor at the desired velocity, in response to the first signal output from the comparator, by driving the windings with pulses having a fixed duration and a frequency equal to that of the reference pulses.

When operating at the desired velocity, the motor is stopped by reverting to the direct current driving mode and reversing the sequential application of direct current drive to the stator windings in response to rotor position until the rotor has stopped.

When operating in the synchronous mode, pulse streams of the same frequency as the reference pulses but sequentially varying in accordance with sine and cosine functions may be applied to the stator winding portions to provide a continuously rotating magnetic field enabling substantially smooth rotation of the rotor at very low speeds.

A variable frequency oscillator may be utilized to hyperbolically vary the output frequency thereof with respect to linear displacement of a wiper of a linear potentiometer connected thereto to enable substantially constant tangential velocity of the portion of a disc rotated by the motor with respect to radial movement of an object, such as a transducer, along the disc.

The foregoing and other objects, features, and advantages of the invention will be apparent from the following more particular description of preferred embodiments of the invention, as illustrated in the accompanying drawing.

DETAILED DESCRIPTION OF THE PREFERRED EMBODIMENT

Figure 1:
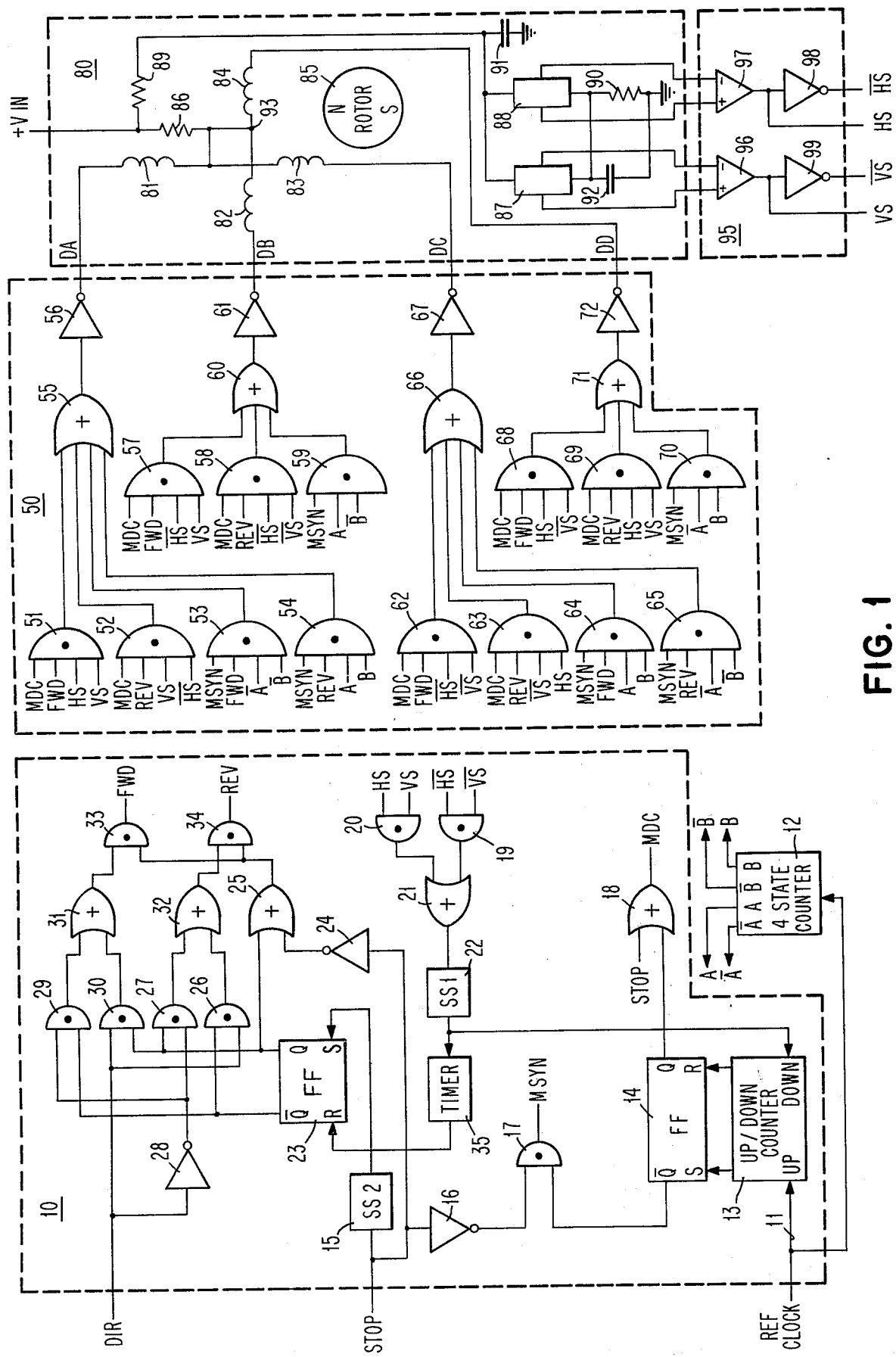
FIG. 1 is a logic circuit diagram of a preferred embodiment of the motor control system of this invention.

Referring to FIG. 1, a preferred embodiment of the system of this invention is shown, including mode control logic 10, stator drive logic 50, motor 80, and rotor position feedback sensing circuits 95. A positive voltage V IN is applied through resistor 86 to one end of each of the stator windings 81, 82, 83, and 84 at node 93. The rotor 85 includes a permanent magnet, thereby eliminating the necessity for including windings on the rotor which would further require the application of current thereto by means of either slip rings or commutation.

Two Hall-effect devices 87 and 88 are disposed at right angles to each other and adjacent to rotor 85 to cooperate with the feedback sensing circuits 95 to generate signals indicative of the position of rotor 85 relative to the stator windings 81-84 although it will be understood by those skilled in the art that other position sensing devices, such as optical or capacitive sensors may be utilized. The Hall-effect devices 87 and 88 are biased at a voltage between that of V IN and ground by resistors 89 and 90. Capacitors 91 and 92 are connected between th supply terminals of the Hall-effect devices and ground to reduce relatively high frequency noise that may be present on the voltage supply line. The output terminals of devices 87 and 88 are connected to the input terminals of amplifiers 96 and 97, respectively, such that a positive signal VS is output from circuit 95 when, for example, the north pole of rotor 85 is in the vertical position, above center, and a positive HS signal is output from circuit 95 when, for example, the north pole of rotor 85 is in the horizontal position to the right of center. Inverters 99 and 98 provide the $\overline{VS}$ and $\overline{HS}$ complements of the position signals when, for example, the north pole of rotor 85 is in the vertical position, below center, or horizontal position left of center, respectively.

The mode control logic 10 is responsive to the binary level of a single DIR signal to control the direction of motor rotation. Forward, counterclockwise, rotation is achieved by application of a low or 0 (hereinafter, "negative") level DIR signal, while reverse, clockwise rotation is achieved by application of a positive, or 1 level DIR signal.

Motor 85 is stopped by application of a positive level STOP signal, as will be described in detail hereinafter.

A rectangular wave REF CLOCK signal having a frequency proportional to the desired angular velocity of motor 80, dependent upon winding configuration and number of rotor poles, is applied along line 11 to the UP input of up/down counter 13. For highly precise speed regulation during synchronous operation, the REF CLOCK signal may, for example, be generated by a crystal controlled oscillator. Counter 13 may, for simplicity, count from one to four, producing a positive level output signal to the S (set) input of flip-flop 14 when it has reached its highest state and a positive level output signal to the R (reset) input of flip-flop 14 upon reaching its lowest state.

Figure 2:
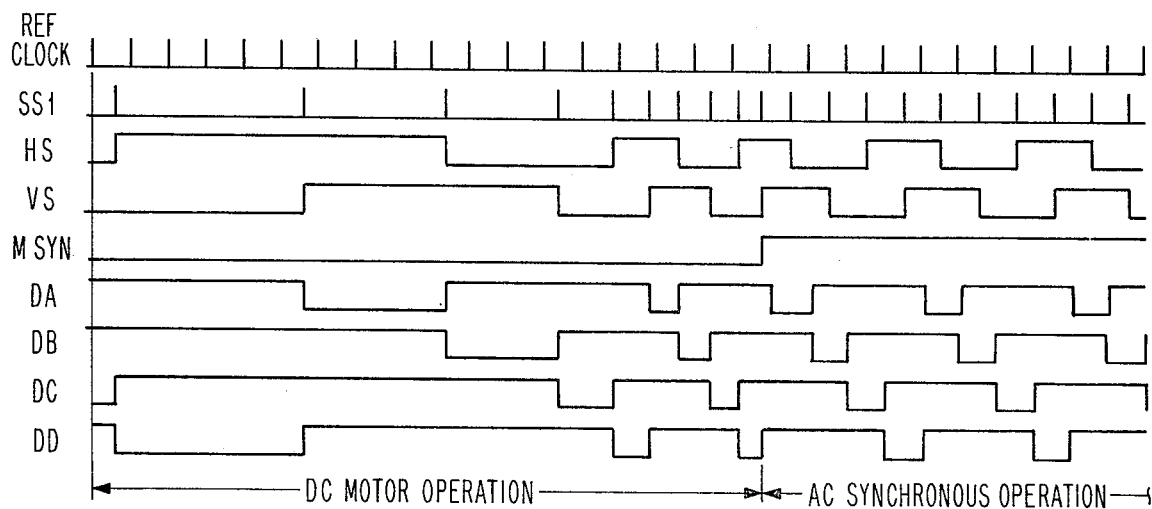
FIG. 2 is a timing diagram depicting operation of the FIG. 1 embodiment of this invention for motor operation from a stopped condition to a synchronous operation.

Referring to FIGS. 1 and 2, assume that it is desired to operate motor 80 from a stopped condition of rotor 85 through synchrous operation in a forward direction. Assume also that flip-flops 14 and 23 are initially reset. A negative DIR signal is inverted by INVERT 28 to produce a positive signal that is applied to an input of AND gate 29. Since flip-flop 23 is reset, a positive signal is produced at the $\overline{Q}$ output thereof that is applied to the other input of AND gate 29, enabling AND gate 29 to produce a positive signal that is gated through OR gate 31 to an input of AND gate 33. A negative STOP signal is inverted by INVERT 24 to provide a positive signal that is gated through OR gate 25 to the other input of AND gate 33, thereby enabling AND gate 33 to provide a positive FWD signal.

Concurrently, assuming that counter 13 can count up to a maximum of four, after four rectangular waveform pulses have been applied along line 11 to counter 13, a positive signal is applied from counter 13 to the S input of flip-flop 14 to provide a positive signal at the Q output of flip-flop 14 that is gated through OR gate 18 to provide a positive MDC signal. The positive FWD and MDC signals are applied to two inputs of AND gates 51, 57, 62, and 68. Assuming that a point on the rotor produces a positive VS signal when it is in the above-center position and a positive $\overline{VS}$ signal when it is in the below-center position, as well as a positive HS signal when it is in the right-of-center position and a positive $\overline{HS}$ signal when it is in the left-of-center position, positive output signals will be individually produced from AND gates 51, 57, 62, and 68 in their named order. The positive signals from these AND gates are gated through OR gates 55, 60, 66, and 71, respectively, which signals are applied to motor DRIVERS 56, 61, 67, and 72 respectively. It is assumed that a negative level input to each of the DRIVERS 56, 61, 67, and 72 provides a substantially open circuit output therefrom, while a positive level signal at the input of each of DRIVERS 56, 61, 67 and 72 provides outputs therefrom having substantially a ground poftential. The DRIVERS 56, 61, 67, and 72, therefore, sequentially generate the sequence of negative, or ground signals DA, DB, DC, and DD to energize windings 81, 82, 83, and 84 in their named sequence. In this direct current mode of operation, motor 80 operates as an electronically commutated motor. The winding which next precedes the rotor position is the winding that is energized.

Rotor 85 will continue to accelerate in this direct current mode of operation toward a terminal angular velocity limited by the motor parameters. The position signals $\overline{HS}$ and $\overline{VS}$ are applied to AND gate 19 and the position signals HS and VS are applied to AND gate 20. Thus, twice per revolution, AND gates 19 and 20 produce positive signals that are gated through OR gate 21 to the input of single shot 22. Single shot 22 provides a first positive output pulse of fixed width on the leading edge of the positive output signal from OR gate 21 and a second positive output pulse of fixed width on the trailing edge of the positive output signal from OR gate 21, regardless of the duration of the input signal applied thereto and, therefore, regardless of the velocity of rotor 85. Thus, single shot 22 produces four pulses for each revolution of rotor 85. The positive output signal from single shot 22 is applied to the DOWN input of counter 13. Thus, when the velocity of rotor 85 has increased to the extent that the frequency of the positive pulses from single shot 22 exceeds the frequency of the REF CLOCK pulses applied to the UP input of counter 13, counter 13 reaches a lower limit and provides a positive output signal to the R input of flip-flop 14 to provide a positive output signal from the $\overline{Q}$ output therefrom that is applied to an input of AND gate 17. The negative STOP signal occurring at this time is inverted by INVERT 16 to provide a positive signal that is applied to the other input of AND gate 17, thereby enabling AND gate 17 to provide a positive MSYN signal at the output thereof. Concurrent with the resetting of flip-flop 14 and the generation of a positive $\overline{Q}$ signal at the output thereof, the Q output of flip-flop 14 becomes negative, thereby inhibiting the positive MDC signal output from OR gate 18.

The MSYN signal is applied to AND gates 53, 59, 64, and 70. The FWD signal is also applied to AND gates 53 and 64.

The REF CLOCK rectangular waveform pulses are applied to the 4 STATE_COUNTER 12. Counter 12 provides, on output lines $\overline{A}$, A, $\overline{B}$, and B, the following sequence of pairs of positive signals: $\overline{A}$ $\overline{B}$, $\overline{AB}$, AB, and $A\overline{B}$. This sequence of pairs of positive signals is applied to inputs of AND gate 53, 69, 64, and 70 to enable the generation of positive output signals from these AND gates in their named sequence. The positive output signals from AND gates 53, 59, 64, and 70 are gated through OR gates 55, 60, 66, and 71, respectively, and are applied to DRIVERS 56, 61, 67, and 72 to provide sequentially grounded DA, DB, DC, and DD signals to selectively energize windings 81, 82, 83, and 84, respectively, in their named sequence. When the windings are driven through AND gates 53, 59, 64, and 70 motor 80 operates as a synchronous motor. Windings 81–84 are driven by pulses having a frequency of the REF CLOCK signals and a duration equal to the period of the REF CLOCK rectangular waveform, as shown in FIG. 2. (The REF CLOCK spikes in the timing diagrams are the positive transitions of the REF CLOCK waveform.) While operating in synchronous operation, therefore, the amount of rotor torque determines what portion of the drive pulses DA–DD supply positive torque to the rotor and what portion of these drive pulses supply negative torque to the rotor. Thus, the rotor velocity is closely regulated to a velocity proportional to the frequency of the REF CLOCK pulses and is able to withstand considerable variation in torque while remaining in synchronous operation.

Figure 3:
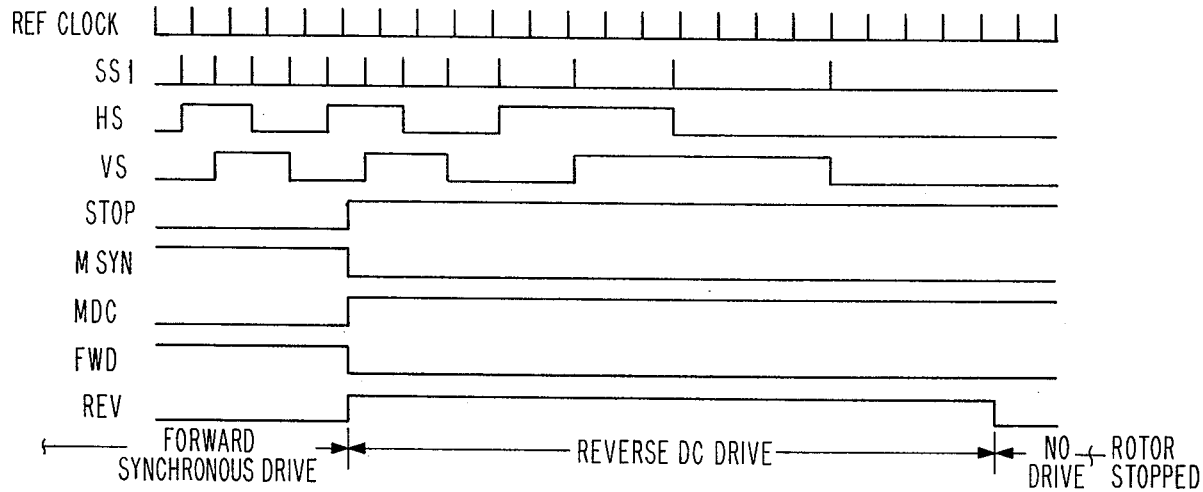
FIG. 3 is a timing diagram depicting operation of the FIG. 1 embodiment of this invention for motor operation from synchronous drive at a desired speed to a stopped condition.

Referring now to FIGS. 1 and 3, rotor 85 is brought to a stop by application of a positive STOP signal to the input of single shot 15, INVERT 16, and OR gate 18. Application of a positive STOP signal to single shot 15 produces a single positive output therefrom that drives the S input of flip-flop 23 to produce a positive signal from the Q output therefrom that is gated through OR gate 25 to an input of AND gate 34 and is also applied to an input of AND gate 27. (Unkike single shot 22, single shot 15 provides an output only on the leading edge of a positive STOP signal and not on the trailing edge.) Since the DIR signal remains negative, the output of INVERT 28 is positive and is applied to another input of AND gate 27 to provide a positive output signal therefrom that is gated through OR gate 32 to the other input of AND gate 34. With both inputs of AND gate 34 receiving positive signals, AND gate 34 provides a positive REV output signal. Concurrently, since flip-flop 23 has become set, the signal from the $\overline{Q}$ output therefrom that is applied to an input of AND gate 29 is now negative which lowers the input of AND gate 33 from OR gate 31 so that the FWD signal is now dropped to a negative level. Also, at this time, the positive STOP signal is inverted by INVERT 16 to provide a negative input to AND gate 17 so that the MSYN signal drops to a negative level. However, the positive STOP signal, applied to an input of OR gate 18 allows OR gate 18 to provde the positive MDC signal therefrom which, along with the positive REV signal is applied to AND gates 52, 58, 63, and 69.

Each of the AND gates 52, 58, 63, and 69 receives one horizontal position signal (HS or $\overline{HS}$) and one vertical position signal (VS or $\overline{VS}$). Thus, AND gates 52, 58, 63, and 69 sequentially provide positive output signals that are gated through OR gates 55, 60, 66, and 71, respectively, and applied to DRIVERS 56, 61, 67, and 72, respectively, to energize windings 81, 82, 83, and 84, respectively, in the direct current mode of operation with the winding immediately succeedng rotor position being driven to effect decceleration of rotor 85.

Each time rotor 85 enters a quadrant that produces a positive output from OR gate 21 and single shot 22, the positive signal from single shot 22 is applied to an input of a timer 35. Timer 35 produces an output signal only in the event that it does not receive a succeeding, positive input pulse within a relatively substantial amount of time. Timer 35 is set so that just before rotor 85 has deccelerated to a stopped position, and before it begins to rotate in a reverse, or clockwise direction, a positive output signal is provided by timer 35 that is applied to the R input of flip-flop 23 to reset flip-flop 23. When flip-flop 23 is reset the Q output signal therefrom drops to a negative level which, is gated through OR gate 25 to provide a negative input to AND gate 34 which, in turn, drops the REV signal to a negative level. Although the $\overline{Q}$ output of flip-flop 23 now provides a positive input to AND gate 29, allowing a positive output signal therefrom that is gated through OR gate 31 to an input of AND gate 33, the positive STOP signal applied to the input of INVERT 24 is inverted into a negative signal that is gated through OR gate 25 to the other input of AND gate 33 which, therefore, forces the FWD output signal from AND gate 33 to remain negative. At this time both the FWD and REV signals are negative so that no drive is applied to the windings of motor 80 and rotor 85 remains stopped.

Figure 4:
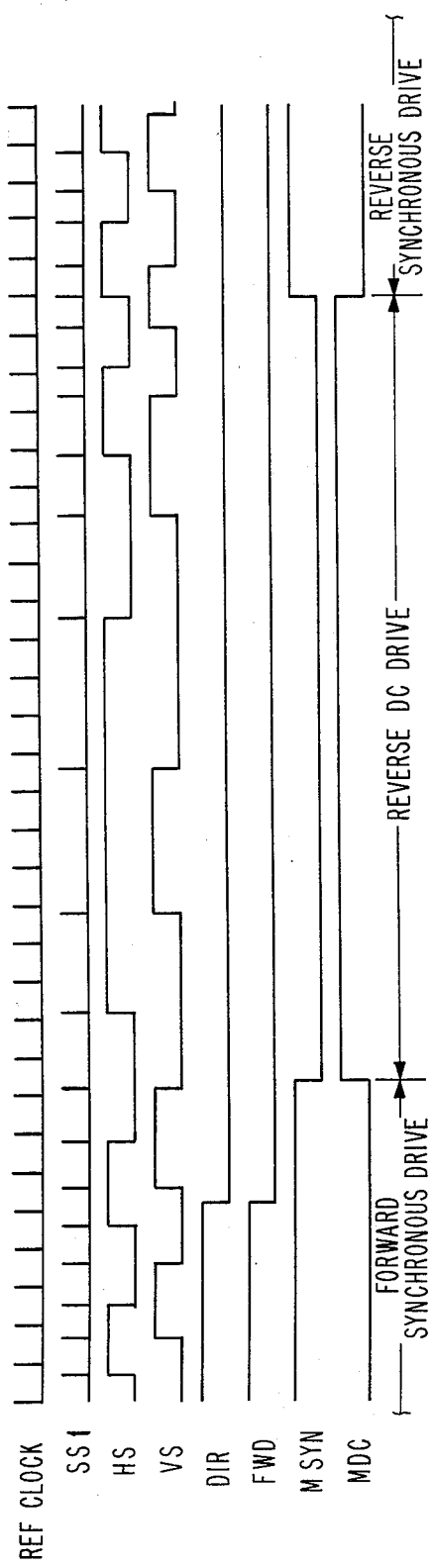
FIG. 4 is a timing diagram depicting operation of the FIG. 1 embodiment of this invention for motor operation from synchronous operation in one direction to synchronous operation in an opposite direction.

Referring now to FIGS. 1 and 4, assume that motor 80 is operating in a forward direction in synchronous operation and it is desired to reverse the rotor direction to operate the motor in synchronous operation in the reverse direction. With the STOP signal remaining at its negative level, application of a positive DIR signal enables one of the inputs of AND gate 26. The positive DIR signal is inverted by INVERT 28 to provide a negative signal to one of the inputs of AND gate 29 such that the output of AND gate 29 drops to a negative level that is gated through OR gate 31 to provide a negative level to one of the inputs of AND gate 33 which, thereby, causes the output of AND gate 33 to drop the level of the FWD signal to a negative level. However, the Q output of flip-flop 23 provides a positive signal to the other input of AND gate 26 which enables AND gate 26 to provide a positive output signal that is gated through OR gate 32 to an input of AND gate 34. The negative stop signal is inverted by INVERT 24 to provide a positive signal that is gated through OR gate 25 to the other input of AND gate 34, thereby enabling a positive REV output signal from AND gate 34. The positive REV and MSYN signals are applied to inputs of AND gates 54 and 65 and the MSYN signals are applied, additionally, to inputs of AND gates 59 and 70. The pairs of positive output signals from counters 12 are applied to AND gates 54, 59, 65, and 70 to provide outputs from these AND gates to energize windings 81–84 for synchronous operation in the sequence of 81, 84, 83, and 82.

Shortly after application of this reversed, synchronous drive to windings 81–84, rotor 85 deccelerates to the extent that counter 13 reaches its highest state and provides a positive output signal to the S input of flip-flop 14, thereby providing a positive signal at the Q output thereof that is gated through OR gate 18 to provide a positive MDC signal. concurrent with the setting of flip-flop 14, a negative level occurs at the $\overline{Q}$ output thereof that is applied to an input of AND gate 17 to drop the MSYN output signal of this AND gate to a negative level. At this time, AND gates 52, 58, 63, and 69 are operative to drive windings 81–84 of motor 80 in a reverse, direct current mode of operation which deccelerates rotor 85 in the forward direction, through a stopped position, and accelerates rotor 85 in the reverse direction until the synchronous speed is reached, at which time flip-flop 14 again becomes reset to enable the positive MSYN signal from AND gate 17 and the negative MDC signal from OR gate 18. At this time, AND gates 54, 59, 65, and 70 are operative to drive the windings of motor 80 in the sequence of 81, 84, 83, and 82.

With motor 80 now operating in the reversed direction synchronous mode, the motor may be stopped by application of a positive STOP signal. The positive STOP signal immediately provides a positive MDC signal from OR gate 18 and a negative MSYN signal from AND gate 17 as described above. The positive STOP signal allows flip-flop 23 to become set which provides a positive Q output signal therefrom that is applied to an input of AND gate 30. With the other input of AND gate 30 the positive DIR signal, AND gate 30 provides a positive output signal that is gated through OR gate 31 to an input of AND gate 33. The positive Q output signal from flip-flop 23 is also gated through OR gate 25 to the other input of AND gate 33, thereby enabling AND gate 33 to provide a positive FWD output signal. With flip-flop 23 now set, the $\overline{Q}$ output signal therefrom is now at a negative level so that the output of AND gate 26 is also at a negative level that is gated through OR gate 32 to an input of AND gate 34. Thus, AND gate 34 now provides a negative REV output signal. Rotor 85, therefore, is now deccelerated by direct current drive in the forward direction with drive signals derived from AND gates 51, 57, 62, and 68 which have rotor position input signals for the direct current driving mode. When the rotor has deccelerated to a very low speed, timer 35 provides a positive output signal that resets flip-flop 23. The resetting of flip-flop 23 results in the FWD signal's dropping to a negative level which inhibits further drive to any of the rotor windings.

Figure 5:
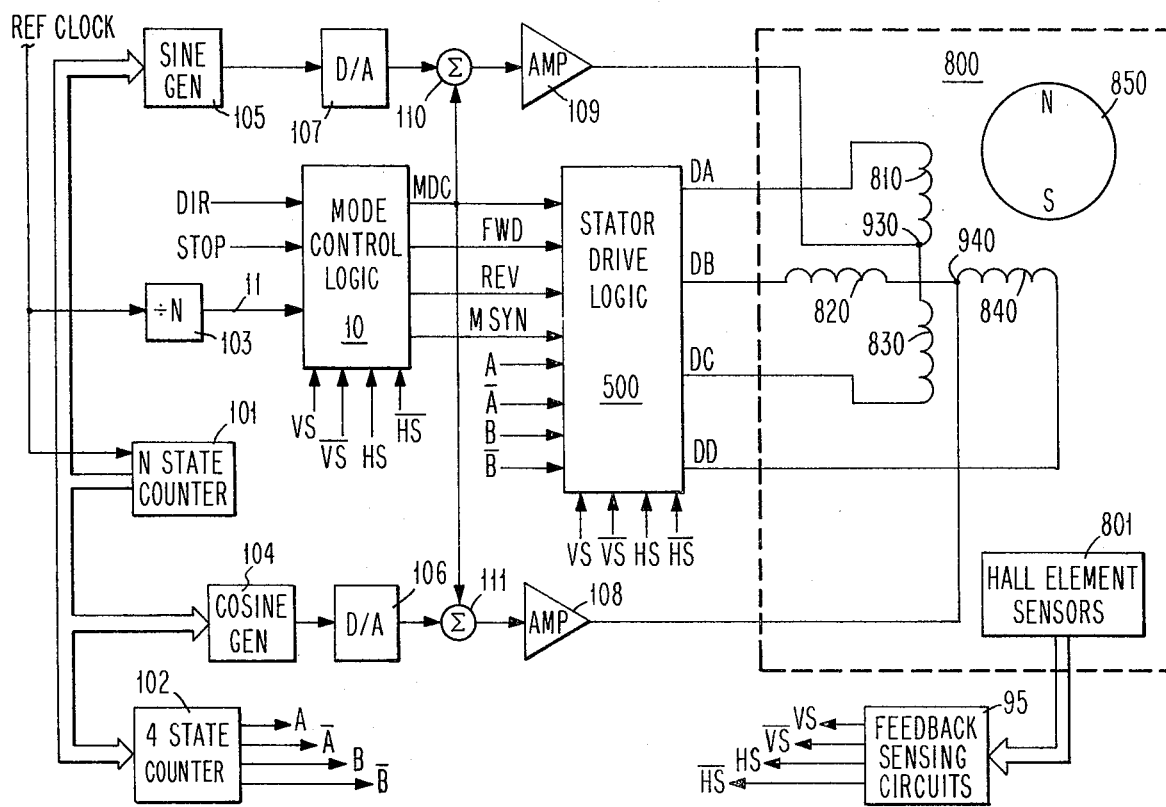
FIG. 5 is a logic diagram of a preferred embodiment of the motor control system of this invention in which the motor windings are driven to produce a continuously rotating magnetic field.
Figure 6:
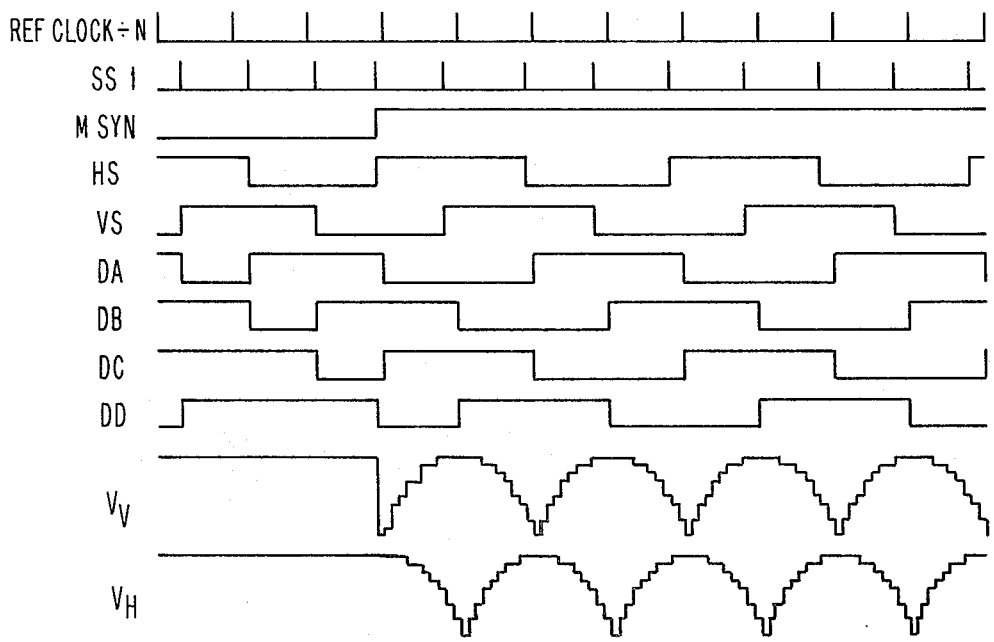
FIG. 6 is a timing diagram depicting operation of the FIG. 5 embodiment of this invention for motor operation from a stopped condition to synchronous operation at a desired speed.

According to the above description, operation of motor 80 in the synchronous mode has consisted of applying to the windings, sequential pulses having a frequency equal to that of the REF CLOCK pulses and a fixed, predetermined duration. At slow speeds in particular, and at all speeds in general, this sequential application of pulses to the windings can result in an uneven rotation of the rotor. Referring now to FIGS. 5 and 6, an embodiment of the invention is shown in which the motor windings are driven to provide substantially smooth and even rotation of the rotor at any speed, including relatively slow speeds.

In FIG. 5, motor 800 includes Hall element sensors 801 for sensing horizontal and vertical positions of rotor 850. Sensors 801 may include, for example, the circuitry shown in motor 80 (FIG. 1) for sensing rotor position including resistors 89 and 90, capacitors 91 and 92, and Hall-effect devices 87 and 88. In FIG. 5, sensors 801 are connected to feedback-sensing circuits 95 in the same manner as shown in FIG. 1 to provide the vertical and horizontal position signals, VS, $\overline{VS}$, HS, and $\overline{HS}$. These four position signals are applied to the mode control logic 10 and the stator drive logic 500. The mode control logic 10 may be, for example, identical to that shown in FIG. 1. The stator drive logic 500 in FIG. 5 may be identical to the stator drive logic 50 in FIG. 1, with the alteration of AND circuitry receiving MSYN signals such that the DA, DB, DC, and DD outputs are sequentially driven negative for two periods, rather than one period of the rectangular waveform input to the mode control logic 10 along line 11, as indicated in FIG. 6 throughout the synchronous mode of operation. It will be obvious to those skilled in the art that this alteration of stator drive logic 50 for utilization as stator drive logic 500 may be effected by the removal of the following inputs from the following AND gates: [remove the] $\overline{B}$ [input] from AND gate 53, B from AND gate 54, A from AND gate 59, B from AND gate 64, $\overline{B}$ from AND gate 65, and remove the $\overline{A}$ input from AND gate 70.

For a synchronous velocity equal to that obtained at a given frequency of REF CLOCK pulses in FIG. 1, a rectangular wave REF CLOCK pulse train that is a multiple of the frequency of the reference pulses applied in FIG. 1 is applied in 'G. 5 to N state counter 101 and to the divide by N 103. As will be fully understood hereinafter, the higher the frequency of REF CLOCK pulses applied to the circuit of FIG. 5, the smoother the rotor operation will be. The division factor, N, in circuit 103 is the multiple of REF CLOCK frequency applied in FIG. 5 divided by the frequency of the corresponding signal applied in FIG. 1 for a given synchronous velocity. The N derived for circuit 103 determines the N number of states for counter 101.

The outputs of counter 101 are applied to cosine generator 104 and sine generator 105. Counter 101 continuously recirculates through its N states. Generators 104 and 105 are configured to provide N digital cosine and sine values, spread equally in degrees over a 360° range for one cycle of counter 101. Generators 104 and 105 may, for example, comprise read-only storages with counter 101 serving as an addressing means to sequentially access storage locations in which these cosine and sine values are stored. Alternatively, generators 104 and 105 may, for another example, comprise a network of logic gates, such as AND gates, which, when driven by the various states of counter 101, provide the digital signals of the cosine and sine functions on the output lines thereof. At each state change by counter 101, digital cosine and sine values are provided from generators 104 and 105, respectively, to digital-to-analog converters 106 and 107, respectively, where these digital, trigonometric values are converted to voltage levels. The outputs of converters 106 and 107 are applied to summing networks 111 and 110, respectively and the outputs of summing networks 111 and 110 are applied to drive amplifiers 108 and 109, respectively. The output of amplifier 108 is connected to an end of motor windings 820 and 840 at node 940 while the output of amplifier 109 is connected to an end of windings 810 and 830 at node 930.

The 4 state counter 102 drives the output lines thereof in the same manner as that described for counter 12 in FIG. 1 to provide the sequence of four pairs of positive signals in the same order and polarity as that described with reference to FIG. 1. However, as described with reference to the modification of stator drive logic 50 to be used as stator drive logic 500, only one of the A, $\overline{A}$, B, $\overline{B}$ signals from counter 102 is applied to the AND gates in the drive logic 500. Further, 4 state counter 102 changes states only at every N/4 state change of N state counter 101.

For operation of the system of FIG. 5 in a forward direction, the DIR signal is applied at a negative level and the STOP signal is switched from the positive to a negative level. Mode control logic 10 provides positive MDC and FWD signals to the summing networks 110 and 111 and to the stator drive logic 500, respectively. It is assumed that the positive level of the MDC signal is sufficient to maintain an output from summing networks 110 and 111 sufficient to saturate amplifiers 108 and 109, thereby allowing the inputs to the summing networks from the digital-to-analog converters 106 and 107 to be ignored during direct current operation of motor 800.

Motor 800 continues to accelerate in the direct current mode until the desired synchronous speed is reached, whereupon the MDC signal drops to a negative level and the MSYN signal is raised to a positive level.

The positive MSYN signal applied to stator drive logic 500 provides sequential negative, or ground, signals on outputs DA, DB, DC, and DD. Each of these signals is negative for two periods of the rectangular waveform input to the mode control logic 10 on line 11, and during the first half of each of the negative signals on outputs DA–DD, the signal on the preceding output is also negative, while during the second half of each of the negative signals on outputs DA–DD, the succeeding signal is also negative, as shown in the right-hand portion of FIG. 6. After the MDC input to summing networks 110 and 111 has dropped, amplifiers 108 and 109 receive approximations of rectified cosine and sine functions that are applied to the motor windings at nodes 940 and 930, respectively. Therefore, during synchronous operation it will be understood that as rotor 850 enters each quadrant the magnitude of drive to the succeeding winding is decreasing while the magnitude of drive to the winding that precedes the rotor is increasing. The decreasing and increasing drives are sine functions displaced 90° from each other. It will be understood that smooth, continuous rotation of rotor 850 will be realized with this driving arrangement.

In FIG. 6 the rectified sine and cosine waveforms $V_L$ and $V_H$ that are applied to nodes 930 and 940 are shown. Each of the steps (except for the peaks) in the waveforms are of equal duration and vary in magnitude in a sinusoidal manner with respect to time. It will be understood by those skilled in the art that the higher the frequency of the REF CLOCK pulses the greater number of step components will be included in the waveforms to more closely approximate the smoothness of sine and cosine waveforms.

Figure 7:
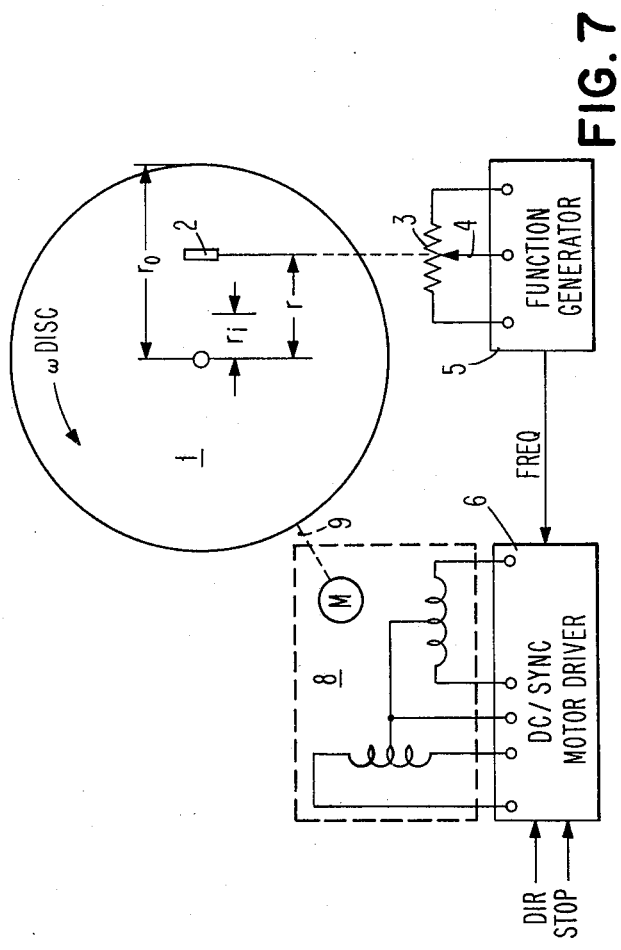
FIG. 7 shows an application for the motor control system of this invention in which a disc is driven at varying velocity to achieve substantially constant tangential velocity of the disc with respect to an object radially moveable along the disc.

Referring now to FIG. 7, a magnetic recording disc 1 is connected to be driven by a motor 8 through transmission 9. U.S. Pat. No. 3,826,965 to C. R. Bringol, filed Nov. 29, 1972, issued July 30, 1974, and entitled Constant Tangential Velocity Motor Control for a Disc Recording System describes a motor control system for a disc recording system wherein a transducer is moved radially along the disc, from a point beyond the center of the disc toward an outer periphery of the disc. In the referenced patent, it is taught that constant tangential velocity of the portion of the disc in contact with, or more closely adjacent to, the transducer is achieved by decreasing angular velocity of the disc rotation with a linear increase in the radial distance of the transducer from the center of the disc. In the referenced patent, a direct current motor which provides an angular velocity having a linear relation to the magnitude of direct current voltage that is utilized to drive the motor which drives the disc. It is, therefore, necessary, to hyperbolically vary the voltage applied to the motor in response to a linear change in the radial position of the recording transducer. In the referenced patent a hyperbolic voltage function generator is disclosed which utilizes a readily available linear potentiometer having a wiper connected for movement with the transducer. Since the function generator circuit draws substantially no current through the wiper, a high degree of precision is attained in generating this hyperbolically varying voltage. The system of the referenced patent also includes an electrical motor driver interposed between the output of the hyperbolic function generator and the motor to vary motor drive in relation to the loading torque, such that a true hyperbolic velocity variation occurs, regardless of changes in the load.

With reference to the above-mentioned U.S. Pat. No. 3,826,965 and to FIGS. 1 and 7 herein, the system shown in FIGS. 1 and 5 herein may be utilized for motor 8 and motor driver 6 of FIG. 7. Motor driver 6 of FIG. 7 is comparable to the motor driver of the referenced patent in that, for a given input, the motor is driven to provide a constant angular velocity. When the logic circuitry of FIG. 1 herein is utilized to drive a motor in the synchronous mode, the angular velocity of the motor remains constant within a range of varying torques and is a function of the frequency of reference pulses applied to the system. Therefore, disc 1 may be driven by motor 8 and motor driver 6 to provide a constant tangential velocity of the portion of disc 1 in contact with, or most closely adjacent to, a transducer 2, regardless of changes in torque within operating limits, by hyperbolically varying the frequency of reference pulses applied to motor driver 6 with respect to linear changes in the radial distance $r$ of transducer 2 from a minimum radius $r_i$ to a maximum radius $r_o$. Hyperbolic frequency function generator 5 includes a linear potentiometer 3 having a wiper connected for radial movement with transducer 2. Radial changes in the position of transducer 2 provide a hyperbolically varying frequency of output pulses that are applied to motor drive 6 to control the synchronous velocity of motor 8.

Figure 8:
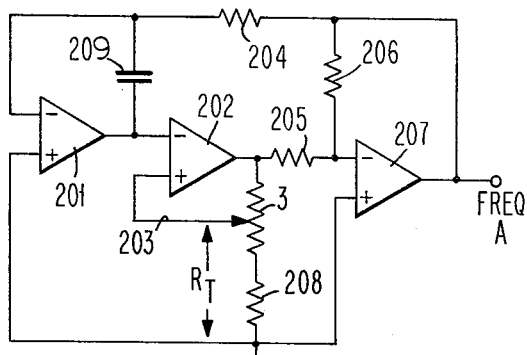
FIGS. 8 and 9 are circuit diagrams of function generators for providing reference pulses for the motor control system of this invention when used in the application depicted in FIG. 7.

Referring now to FIG. 8 a circuit is shown that provides a hyperbolic variation of the frequency of the FREQ A signal with respect to a linear change in the wiper position of linear potentiometer 3. The fixed portion of linear potentiometer 3 is connected from the output of amplifier 202 to ground through resistor 208. The resistance of resistor 208 corresponds to the distance between the center of disc 1 and the minimum radius position, $r_i$ of transducer 2.

Operational amplifier 202 is used in a multivibrator capacity, while operational amplifier 207 is used in an inverting capacity and operational amplifier 201 with capacitor 209 and resistor 204 are used as an integrater. Resistors 205 and 206 determine the effective gain of the inverting circuit including amplifier 207. Assuming an above-zero output from amplifier 202, $+V_o$, and assuming that the inverting circuit including amplifier 207 has a gain of $-1$, a below-zero voltage, $-V_o$, is present at the node joining resistors 204 and 206. This voltage attempts to pull the negative input of amplifier 201 more negative as a function of time which, in turn, drives the output of amplifier 201 toward $-V_o$. At the time when the negative input of amplifier 202 becomes more negative than the positive input of amplifier 202, as determined by the setting of the wiper 203 of potentiometer 3 connected to the positive input of amplifier 202, the output of amplifier 202 switches to a negative level of $-V_o$. This causes the output of amplifier 207 to assume a voltage of $+V_o$ that is applied to resistor 204. The charge on capacitor 209 now reverses as a function of time and the now positive, rising output voltage from amplifier 201 eventually reverses the output of amplifier 202 when the absolute value of the output voltage from amplifier 201 exceeds the absolute value of the voltage on wiper 203 as determined by the wiper setting of potentiometer 3. The values of capacitor 209 and resistor 204 may be varied to determine the output frequency FREQ A at a given setting of potentiometer 3.

Figure 9:
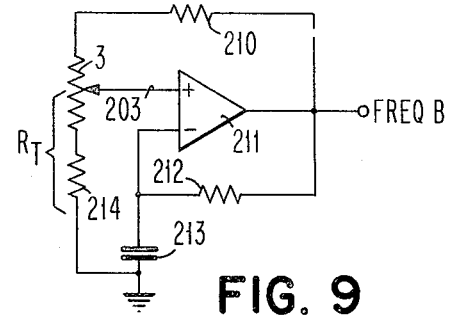

The circuit of FIG. 9 is a simplified embodiment of a function generator that produces a hyperbolic variation in output frequency with a linear change in the position of a linear potentiometer wiper. In FIG. 9, operational amplifier 211 includes a positive input connected along line 203 to the wiper of a potentiometer 3. Resistor 210 is interposed between one end of potentiometer 3 and the output of amplifier 211 while resistor 214 is interposed between the other end of potentiometer 3 and ground. Resistor 214 corresponds to resistor 208 in the circuit of FIG. 8, and the value for resistor 214 is chosen accordingly. A capacitor 213 is connected between ground and the negative input of amplifier 211, while resistor 212 is connected between the negative input of amplifier 211 and the ouput terminal thereof from which the ouput signal, FREQ B is obtained.

In operation, assume that the output of amplifier 211 has just switched to a $-V_o$ level. The voltage on the wiper 203, positive input to amplifier 211 is now a negative voltage, determined by the setting of the wiper of potentiometer 3. Capacitor 213 now begins charging toward $-V_o$; however, as soon as the negative input of amplifier 211 is driven more negative than the positive input thereof, the ouput of amplifier 211 switches to a positive level of $+V_o$. Capacitor 213 then begins charging to a positive level, and when the negative input voltage exceeds the positive input voltage of amplifier 211 the output will again switch to the negative, $-V_o$, level.

In both of the circuits in FIGS. 8 and 9, substantially no current is drawn through the wipers of potentiometer 3, so that a high degree of precision is attainable in generating a frequency that has a hyperbolic change with respect to a linear change in the position of a linear potentiometer wiper. For greatest precision, the embodiment of FIG. 8 is preferred.

The tangential velocity, $V_t$, of disc 1 at transducer 2 is expressed as:

$$V_t = \omega_{disc} \, r \qquad (1)$$

where:

$\omega_{disc}$ = angular velocity of disc 1 in revolutions per second; and $r$ = radial distance from the center of disc 1 to transducer 2.

Depending on the speed change factor, $K_1$, of transmission 9, $$\omega_m K_1 = \omega_{disc} \qquad (2)$$

where:

$\omega_m$ = angular velocity of motor 8 in revolutions per second.

Assuming, during synchronous operation, four drive pulses to the motor windings per revolution of the rotor, $$\omega_m = f_{rc}/4 \qquad (3)$$

where:

$f_{rc}$ = REF CLOCK frequency.

Combining equations (1), (2), and (3), $$V_t = f_{rc} K_1 \, r/4 \qquad (4)$$

As stated above and in the referenced U.S. Pat. No. 3,826,965, it is desirable that $V_t$ be constant.

When the wiper of linear potentiometer 3 is connected for movement with transducer 2, the resistance, $R_T$, which includes, in FIG. 8 the resistance between wiper 203 and ground along resistor 208 and potentiometer 3, and in FIG. 9 the resistance between wiper 203 and ground along resistor 214 and potentiometer 3, may be expressed as:

$$R_T = R/K_2 \qquad (5)$$

where:
$K_2$ = constant expressed in resistance per unit distance.

Therefore:

$$V_t = \frac{f_{rc} K_1 K_2 R_T}{4} \qquad (6)$$

and:

$$f_{rc} = \frac{V_t 4}{K_1 K_2 R_T} = \frac{K_A}{R_T} \qquad (7)$$

where:
$K_A$ = combination of all constants.

Observing equation (7) it is seen that the hyperbolic relationship, in which the product of two variables equals a constant, exists between $f_{rc}$ and $R_T$. It is, therefore, understood that a particular circuit configuration is necessary to produce this relationship.

The circuit of FIG. 8 oscillates with the voltage at the inverting (negative input) terminal of amplifier 202 going between plus and minus, $$\left[\frac{R_T}{R_{208}+R_3}\right] V_o \text{ volts} \qquad (8)$$

where:
$R_{208}$ = resistor 208 resistance; and
$R_3$ = potentiometer 3 resistance.

The time, $T_1$, for the integrator to make the excursion necessary for retriggering the circuit is:

$$\frac{V_{207} T_1}{R_{204} C_{209}} = 2 \left[\frac{R_T}{R_{208}+R_3}\right] V_{202} \qquad (9)$$

where:
$|V_{207}| = |V_{202}| = |V_o|$;
$R_{204}$ = resistor 204 resistance; and
$C_{209}$ = capacitor 209 capacitance.

The REF CLOCK frequency, $f_{rc}$, is, therefore, $$f_{rc} = \frac{1}{2T_1} = \frac{R_{208}+R_3}{4R_T R_{204} C_{209}} \qquad (10)$$

and the desired, hyperbolic relationship between $f_{rc}$ and $R_T$ is satisfied, since $R_{208}$, $R_3$, $R_{204}$ and $C_{209}$ are constants.

The circuit of FIG. 9 operates in a similar manner, but with the approximate integrator action of resistor 212 and capacitor 213. Assuming the oscillator has switched to the positive output state, the initial voltage across capacitor 213, $V_{init}$, is:

$$V_{init} = \frac{-R_T V_o}{R_{214}+R_3+R_{210}} = \frac{-R_T V_o}{R_S} \qquad (11)$$

where:
$R_{214}$ = resistor 214 resistance;
$R_{210}$ = resistor 210 resistance; and
$R_S$ = resistance sum of resistors 210, 214 and potentiometer 3.

The circuit will switch again when the voltage across capacitor 213 is the above magnitude, $V_{init}$, but opposite polarity. The time, $T_2$, to switch is:

$$T_2 = R_{212} C_{213} \log_n \left[\frac{V_o + \frac{R_T}{R_S} V_o}{V_o - \frac{R_T}{R_S} V_o}\right] \qquad (12)$$

where:
$R_{212}$ = resistor 212 resistance; and
$C_{213}$ = capacitor 213 resistance.

Multiplying the numerator and denominator of equation (12) by $R_S$, $$T_2 = R_{213} C_{213} \log_n \left[\frac{R_S + R_T}{R_S - R_T}\right] \qquad (13)$$

If $T_2$ is directly proportional to $R_T$; that is, if $dT_2/dR_T$ is a constant, then $f_{rc}$ is directly proportional to $1/R_T$.

Differentiating $T_2$ with respect to $R_T$, $$\frac{dT_2}{dR_T} = R_{212} C_{213} \left[\frac{2R_S}{R_S^2 - R_T^2}\right] \qquad (14)$$

Therefore if $R_S^2$ far exceeds $R_T^2$, then $dT_2/dR_T$ is a constant, and, $$f_{rc} \approx \frac{R_S}{2 R_{212} C_{213} R_T} \qquad (15)$$

Observing equation (15) it is seen that an approximation of the desired hyperbolic relationship between $f_{rc}$ and $R_T$ exists, since $R_S$, $R_{212}$, and $C_{213}$ are constants.

In summary, a motor control system has been described in which direct current is sequentially applied to portions of the motor stator windings in response to rotor position signals until the rotor has reached a desired angular velocity corresponding to the frequency of a source of reference pulses, at which time the stator windings are driven in a synchronous manner by pulses of a predetermined, fixed duration having a frequency equal to that of the reference pulses. The motor is stopped by reverting to the direct current driving mode and driving the windings in a reversed sequence. Sine and cosine drive circuitry is disclosed to enable the generation of a substantially continuously rotating magnetic field by the stator windings to allow smooth rotor rotation at very low speeds. Further, circuitry is disclosed to provide a hyperbolic variation in the frequency of the reference pulses to allow utilization of the motor system in a disc recording system whereby substantially constant tangential velocity of the portion of the disc most closely adjacent to the transducer is realized by movement by the transducer of a wiper of a linear potentiometer included in the hyperbolic frequency generator circuit.

While the invention has been paticularly shown and described with reference to preferred embodiments thereof, it will be understood by those skilled in the art that various changes in form and details may be made therein without departing from the spirit and scope of the invention.

What is claimed is:

1. A motor control system for a motor having at least two stator windings angularly disposed about a rotor, comprising:

direct current means for generating position signals indicative of the position of said rotor relative to said windings;

a source of reference pulses having a frequency corresponding to a desired angular velocity of said rotor;

comparison means connected to said generating means and to said reference pulses for providing a first signal when the angular velocity of said rotor is equal to said desired angular velocity, and a second signal when the angular velocity of said rotor is less than said desired angular velocity;

logic means connected to said comparison means and to said generating means for driving said motor in a direct current mode by sequentially applying, in response to said second signal, direct current pulses to said stator windings according to the position of said rotor, said logic means driving said motor in a synchronous mode by sequentially driving, in response to said first signal, said windings with pulses of a predetermined duration at said frequency of said reference pulses; and said comparison means and said logic means enabling repeated automatic transition from said direct current mode to said synchronous mode and from said synchronous mode to said direct current mode.

2. The system of claim 1 further comprising direction reversing means for: (1) reversing said sequential driving of said windings at said frequency and duration of said reference pulses; (2) reversing said sequential application of direct current to said stator windings until said rotor has attained said desired velocity in an opposite direction; and (3) driving, in response to said first signal, said windings in an opposite sequence with pulses of a predetermined duration at said frequency of said reference pulses.

3. The system of claim 1 further comprising stopping means for reversing said sequential application of direct current to said stator windings, in accordance with rotor position, until said rotor has stopped.

4. The system of claim 3 wherein said comparison means further comprises a bi-directional counter means having said source of reference pulses connected to increment said bi-directional counter means in a first direction and having said generating means connected to increment said bi-directional counter means in a second direction.

5. The system of claim 4 wherein said comparison means further comprises bistable means connected to said bi-directional counter and set in a first condition to produce said first signal in response to said bi-directional counter means reaching a limit in said second direction and set in a second condition to produce said second signal in response to said bi-directional counter means reaching a limit in said first direction.

6. The system of claim 5 wherein said stator windings include n portions and said logic means includes an n state counter means connected to said source of reference pulses for sequentially providing a plurality of combinations of driving signals on the output terminals of said counter means.

7. The system of claim 6 wherein said rotor includes a permanent magnet.

8. The system of claim 7 wherein said generating means include Hall-effect devices.

9. The system of claim 1 further comprising means independent of said portions of said stator windings for generating sine and cosine waveforms, said function generating means cooperating with said portions of said stator windings and said logic means enabling said stator windings to produce a substantially continuously rotating magnetic field throughout the duration of said first signal.

10. The system of claim 9 further comprising a sine wave generator and a cosine wave generator triggered by a counter receiving pulses from said souce of reference pulses.

11. The system of claim 1 wherein said source of reference pulses further comprises a variable frequency oscillator in which the output frequency is varied hyperbolically with respect to linear displacement of a wiper of a linear potentiometer connected thereto.

12. The system of claim 11 further comprising a recording disc connected for movement by said motor and a transducer radially moveable along said disc, said wiper being connected for movement with said transducer and electrically connected to a first input of an amplifier.

13. The system of claim 12 wherein said linear potentiometer is fixedly mounted substantially parallel to a radius of said disc.

14. The system of claim 13 wherein both ends of said linear potentiometer are offset from the center of said disc, said function generator further including a resistance in series with the end of said potentiometer in closest proximity to said center of said disc.

* * * * *